Figure 1:
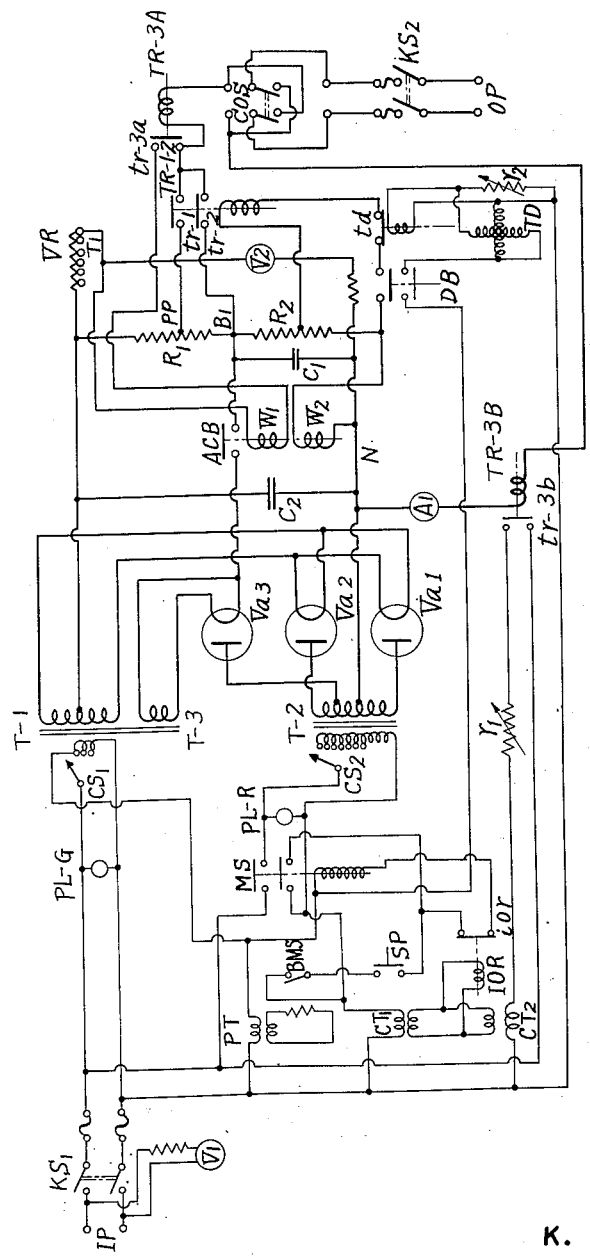

Jan. 15, 1957   KUNIZO KATSUMARU ET AL   2,777,988
DEVICE FOR WELDING FAULTY POINT OF COMMUNICATION CABLES
Filed Feb. 3, 1953                                    2 Sheets-Sheet 1

INVENTORS
K. KATSUMARU
S. HAYASHI
R. IWAI

BY Wenderoth, Lind & Ponack
                          ATTORNEYS

2,777,988

DEVICE FOR WELDING FAULTY POINT OF COMMUNICATION CABLES

Kunizo Katsumaru, Suginami-ku, Tokyo, Shigenori Hayashi, Sakyo-ku, Kyoto, and Ryoichi Iwai, Ikoma-gun, Nara-ken, Japan, assignors to Nippon Denshin Denwa Kosha, Tokyo, Japan, a corporation of Japan Application February 3, 1953, Serial No. 334,792

5 Claims. (Cl. 324—51)

This invention relates to a device for welding faulty point of communication cables, more especially a device by which a faulty point of the line caused by high resistance is welded, said fault caused by high resistance being a fault in case the inter-core insulation of a paper-insulated multi-core communication cable is lowered down and the inter-core connection is made through high resistance.

(In order to simplify the explanation given hereunder, the said line fault caused by short circuit is referred to as a "short circuit fault," and the said line fault caused by lowering of inter-cable-core insulation as a "high resistance fault.")

It has, hitherto, been known to locate a line fault of communication cables by using Varley's, and Murrey's loop-methods or by using the Telefault method (search coil method). However, according to Varley's, and Murrey's loop-methods, an accurate location is made difficult, due to the fact that the difference of resistance value of non-faulty line and that of faulty line is not always large enough, and that a leakage or noise current from other lines causes an error on reading the meter. Furthermore, the location is made impossible in case all the lines are faulty. As for the Telefault method, the search can only be made with a certain intensity of magnetic field, and for this purpose, the resistance of the faulty section is required to be less than several kilo-ohms. Therefore, this method is also disadvantageous in locating a high resistance fault.

According to the United States practice, the Telefault method is used for locating a high resistance fault by impressing intermittently voltages of the order of several hundreds of volts on the faulty cable-cores several times in advance, so that the resistance of the faulty section is lowered by steps down to several kilo-ohms. However, a certain technical skill is required to determine the lowering of resistance of faulty section. And, the resistance is not necessarily lowered, but is increased sometimes by reasons such as evaporation of water. It occasionally happens that the resistance of the faulty section once lowered by the impression of voltages is restored to its original state after a short period of time. Therefore, a high resistance faulty section cannot always be accurately located, in spite of the fact that the operation is more or less troublesome.

Very frequently, moisture having penetrated into communication cables through pin holes of the lead sheath and other cracks causes line faults by lowering the inter-cable-core insulation resistance. In this case, adjoining cores are almost short-circuited, or are bridged through a high resistance. As described above, any known method of locating line faults cannot give satisfactory results as far as a high resistance fault is concerned.

The object of the present invention is to provide a device for welding completely a line fault of communication cables, without damaging other parts of the core not affected by fault, in case adjoining cores are bridged through a high resistance.

In accordance with a feature of the present invention, a means for supplying D. C. or A. C. breakdown voltage having a high voltage and low current capacity to the faulty section between the adjoining cores, and also a means for supplying a welding current having a lower voltage and a larger current capacity than said breakdown voltage, without interruption after the breakdown voltage, are provided. By these means, said faulty section caused by high resistance is broken down, welded and completely short-circuited no matter what the inter-core resistance value is. A high resistance fault being now replaced by a short circuit fault, the faulty section can be accurately located by methods such as bridge method. And, in case a large current capacity is held at the breakdown voltage source, there is a danger that the parts of cores tested not affected by fault are also damaged when the faulty section is broken down. However, such danger can be eliminated by varying the current capacity of the breakdown voltage and that of welding voltage. By this means, the breakdown voltage and the welding voltage can be chosen each at a desired value, so that the breakdown and welding of the faulty section can surely be effected.

Another feature of the present invention is that a means is provided for removing automatically from the pair of faulty cores the impressed breakdown voltage and welding voltage after the lapse of a prescribed period of time, in case no breakdown takes place. By this means, the impression of a high voltage and a flow of a large current during the period of time longer than necessary are avoided so that the cable can be protected satisfactorily.

Another feature of the present invention is that a means is provided to limit the time of flow of current in response to the magnitude of current, in case welding current flows through faulty section. By this means, the flow of larger welding current during the period of time longer than necessary can be avoided.

Another feature of the present invention is that a means is provided for controlling the welding voltage impressed on and the welding current flowing in the circuit of the cores to be examined. By this means, the welding voltage and current are adjusted to the impedance of the said circuit, namely to the distance between the voltage supply section and the faulty section, so that too much voltage and current are prevented from being supplied to the said circuit of the cores, thereby protecting the cable-cores and surely effecting the welding.

Another feature of the present invention is that a means is provided for reversing, in case a D. C. voltage is used, the polarity of the breakdown voltage and welding voltage to be impressed on the circuit of the cores to be examined. By this means, if a satisfactory welding of the faulty section is not obtained by the first impression of breakdown voltage and welding voltage, a sure welding is effected by the second impression of the said voltages on the same section, but this time reversing the polarity of the said voltage. This effect has been confirmed by experience.

Another feature of the present invention is that a means is provided for restoring the locating device to the state ready for the next operation and maintaining the same state, just after the breakdown voltage and the welding voltage are automatically removed, on completion of scanning, from the circuit of cores examined. By this means, the operation of locating the same pair of faulty cores with reversed polarity, and also the operation of locating a great number of pairs of faulty cores can be made within a short period of time, and the operation efficiency can be improved greatly.

The above object and features of the present invention will be made more apparent by the following explanation described with reference to the accompanying drawings which illustrate certain embodiments of the invention.

Figure 2:
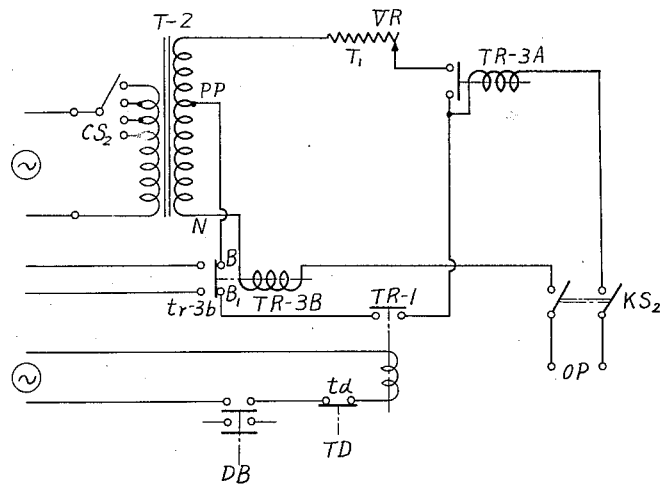
Figure 3:
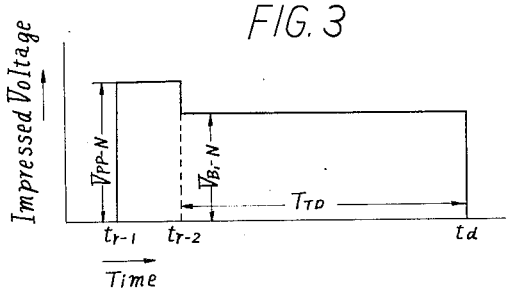
Figure 4:
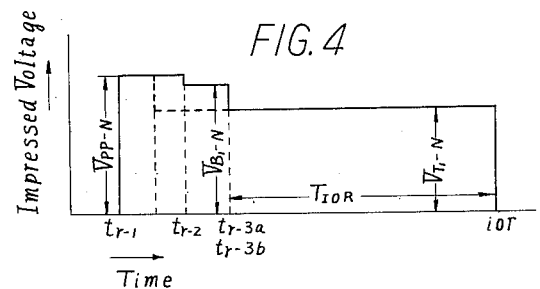

In the drawings,

Fig. 1 shows the electric circuit diagram of one embodiment in which a D. C. voltage is used as breakdown voltage and welding voltage, and, Fig. 2 shows a part of the electric circuit diagram of another embodiment, in which an A. C. voltage is used as breakdown voltage and welding voltage (on the primary side of the transformer, the same control circuit as in Fig. 1 is connected, but is not shown in Fig. 2), and, Fig. 3 shows the relation, with time, of the voltage impressed on the circuit of cable-cores to be examined according to the device shown in Fig. 1, in case any breakdown and welding are not effected, and, Fig. 4 shows the relation, with time, of the impressed voltage according to the device shown in Fig. 1, in case breakdown and welding are effected.

We shall hereunder explain the operation of the device.

In the device shown in Fig. 1, a terminal IP is connected to the source of 100v alternating current, and an input side switch $KS_1$ is closed. Transformers T-1 and T-3 are then energized and the cathodes of diode rectifiers $Va_1$, $Va_2$ and $Va_3$ are heated. A potential transformer PT is also energized, and the heater of a bimetal switch BMS connected on the secondary side of PT is heated. The contact of BMS is closed 20 to 30 seconds after the closing of $KS_1$, and then by pushing a starting push button SP, the coil of an electro-magnetic relay MS is energized, and closes the contact thereof, thereby energizing a transformer T-2. $Va_1$, $Va_2$ and $Va_3$ then operate, forming a closed circuit with $R_1$ and $R_2$, resistances forming potential dividers, and charging a condenser $C_1$ at about 1000 v. and a condenser $C_2$ at about 2000 v. The contact of an electromagnetic relay ACB is closed by the energization of its coil $W_2$. The device is now ready for starting operation.

Then, an output terminal OP shown at the right hand side of Fig. 1 is connected to the cable-cores to be examined, and by closing an output side switch $KS_2$ and pushing the push button switch DB, the coil of an electro-magnetic relay TR-1-2 is connected to the source through a contact of DB and a usually closed contact $td$ of an electro-magnetic relay TD. TR-1-2 now operates, closing the first contact $tr$-1 and, with a time lag of 5 to 100 milli-seconds, the second contact $tr$-2.

By the closing of $tr$-1, a voltage of about 1300 v., taken from a tap $pp$ of $R_1$ and $R_2$, is impressed on the output terminal OP and then, after a prescribed period of time, a voltage of about 1000 v. is impressed on OP by the closing of $tr$-2. However, TD starts its operation at the same time as DB is pushed, and after the lapse of 2 to 4 milliseconds, depending upon the time setting thereof, the contact $td$ is opened, TR-1-2 is restored to its initial state, and the voltage impressed on the output terminal is removed at the same time.

The relation of the above voltage is impressed on OP with time is shown in Fig. 3. Namely, at the same time as the closing of $tr$-1, a voltage $V_{pp-N}$ (about 1300 v.), representing voltage between the tap $pp$ of $R_1$ and $R_2$ and a bus N, is impressed on OP, and continues to stay until the closing of $tr$-2. When $tr$-2 is closed, a voltage $B_1$-N (about 1000 v.), representing voltage between the tap $B_1$ and N, is impressed on OP. This voltage continues to stay until TD opens the contact $td$, corresponding to the time setting thereof, and is reduced to zero when $td$ is opened. TD is an induction type relay having a rotating disc. When TD is not energized, the contact $td$ thereof is closed. However, when TD is energized by the operation of push button DB, the torque is induced to said disc, which makes the disc start to rotate. The contact $td$ is opened after a certain time lag. The period of said time lag can be determined at will by the adjustment of time setting of said relay by means of $r_2$.

The above voltage is impressed for the purpose of breaking down the faulty section of the circuit to be examined. A higher voltage is impressed at the start to compensate for the delay of building up of impressed voltage caused by the time constant of the circuit to be examined.

The relation between the impressed voltage and time, shown in Fig. 3, concerns the case in which the circuit is not broken down and therefore a load current is not flown into the circuit. If a faulty section exists in the circuit to be examined, and the faulty section is broken down by the voltage impressed initially, the impedance of the circuit is lowered and a load current flows into the circuit. In this case, electromagnetic relays TR-3A and TR-3B operate to close the contacts thereof, $tr$-3a and $tr$-3b. By the closing of $tr$-3a, the whole terminal voltage of $R_1$ and $R_2$ and the charging voltage (about 2000 v.) of $C_2$ are impressed on the circuit, through the coil $W_1$ of the electro-magnetic relay ACB and a variable resistance VR. As the coil $W_1$ of ACB is made to be in back ampere turns to the coil $W_2$, the contact of ACB is opened in the above case, $Va_3$ being cut off thereby.

Too much current may flow into the circuit to be examined, depending upon the location of the faulty section. For this reason, the capacity of the source supplying power to the device becomes insufficient, and the voltage is lowered considerably, so that a voltage and a current required by the load may not be obtained.

However, in accordance with the present invention, $tr$-3a is closed as afore-mentioned, and the whole terminal voltage of $R_1$ and $R_2$ as well as the charging voltage of $C_2$ are impressed to maintain the load voltage. Furthermore, the load voltage and the load current are controlled by the adjustment of the variable resistance VR, and therefore the said voltage and current are maintained at a desired value.

If the sliding contact of VR is always placed at the VR max. position at the start of the operation of locating line faults, the voltage fall in VR becomes larger even when the distance between the examiner's position and the faulty section is small and the impedance of the circuit to be examined is extremely small, thereby restricting the load current and protecting the cable cores.

The closing of the contact $tr$-3b of TR-3B energizes the current transformer $CT_2$, and therefore, an over load relay IOR starts its operation, being energized by $CT_1$ and $CT_2$. After the closing of $tr$-3b, and after a certain period of time determined by the magnitude of the load current, IOR opens its contact $ior$. The electro-magnetic switch MS is opened thereby, and removes the voltage from the circuit examined, by cutting off the primary side of the transformer T-2 from the power supplying source.

The relation with time of the impressed voltage on the circuit in the above case is shown in Fig. 4. By the contact of $tr$-1 of TR-1-2, the breakdown voltage $V_{pp-N}$ is impressed, and then by the contact of $tr$-2 the impressed voltage becomes $V_{B_1-N}$. And then, when the current flows into the circuit, $tr$-3a and $tr$-3b contact and a voltage, representing voltage between a point $T_1$ of variable resistance VR and the bus N, is impressed. The impression of $V_{T_1-N}$ starts when $tr$-3b contacts and continues until IOR operates. The operating time $T_{IOR}$ of IOR is determined depending upon the load current flowing into the primary side of T-2, namely, the load current flowing into the circuit to be examined. The above load current is the welding current for the purpose of welding the broken-down section of the said circuit, and therefore, $V_{T_1-N}$ represents the welding voltage for supplying the said welding current. The scanning of the circuit by the use of the present device is completed when IOR operates and the voltage is removed from the circuit. In the course of the above scanning period, the faulty section is broken down and welded, and a high resistance fault is replaced by a short circuit fault.

Even after the completion of the above scanning, the cathodes of $Va_1$, $Va_2$ and $Va_3$ are maintained at heated condition, and BMS is still kept closed. The device is ready for the starting of next operation. It is therefore possible to start operation only by connecting the circuit to be examined to OP and by pushing the push buttons SP and DB, and therefore we can save the time of heating the cathodes of the diode rectifiers and closing the bimetal switch.

A change-over switch is shown at COS for reversing the polarity of voltage impressed on the circuit to be examined. The experimental research made by the inventors proved that, in case the faulty section is not broken down by the first impression of the breakdown voltage and welding voltage (in order not to damage the cores not affected by fault, the breakdown voltage used for the practice of the present invention shall have a lowest possible voltage, and the duration of impression of such voltage shall be minimized. It sometimes happens, therefore, that the faulty section is not broken down by the first impression), it can be completely broken down by the second impression of the said voltages by reversing the polarity thereof. The reason for that is believed to be that the progress of breakdown around the electrode surface differs depending upon the voltage polarity in case D. C. breakdown voltage is used. Therefore, it is an effective means for obtaining a sure operation of the device to provide on it the said change-over switch COS.

Referring again to Fig. 1, an input side alternating-current voltmeter is shown at $V_1$, an output side direct-current voltmeter at $V_2$, and an output side ammeter at $A_1$. Two pilot lamps are shown at PL–G and PL–R, and adjustable resistances are shown respectively at $r_1$ and $r_2$. Also, tap exchange devices provided on the primary of T–1, T–2 and T–3 are indicated at $CS_1$ and $CS_2$.

Fig. 2 shows an electric circuit diagram of another embodiment of the invention in which A. C. voltages are used for breakdown voltage and also for welding voltage. The figure shows only the parts which are different from the device shown in Fig. 1.

When A. C. voltages are used, diode rectiers $V_{a1}$, $V_{a2}$ and $V_{a3}$, smoothing condensers $C_1$ and $C_2$, resistances forming potential dividers $R_1$ and $R_2$, change-over switch COS, and transformers for heating diode rectifier cathode T–1 and T–3 can be omitted, compared with the device of Fig. 1.

In Fig. 2, a transformer T–2 is energized by closing an input side switch, and the circuit to be examined is connected to an output terminal OP. Then, by closing an output switch $KS_2$ and pushing a push button switch DB, the contact of a relay TR–1 is closed, and a part of the secondary voltage of T–2, $V_{pp-N}$, is impressed on OP. In case the circuit to be examined is not broken down by $V_{pp-N}$, a relay TD operates and opens the contacts thereof, after the lapse of time prescribed by the time setting thereof. The contact of TR–1 opens also, and removes the above voltage $V_{pp-N}$ from the output terminal. On the contrary, in case the faulty section of the circuit to be examined is broken down by $V_{pp-N}$ and a load current flows there-in, both relay TR–3A and TR–3B operate, closing the contact of TR–3A, opening the contacts B and $B_1$ of TR–3B, and closing the contacts $tr$–$3b$. Therefore, the whole voltage $V_{T-N}$ of T–2 is impressed on OP through a variable resistance VR, and the welding current is supplied for welding the faulty section. That the magnitude of the welding current can be controlled by the adjustment of VR, in this case, is the same as in Fig. 1. That the closing of $tr$–$3b$ makes an over load relay IOR (not shown) operate, and opens the contact thereof with the time limit corresponding to the magnitude of load current, and then the voltage $V_{T-N}$ is removed from OP by the cutting off of the primary circuit of T–2 is also the same as in Fig. 1.

As described above with reference to Figs. 1 and 2, both A. C. voltage and D. C. voltage can break down and weld the faulty section.

While the principles of the invention have been described above in connection with specific embodiments thereof, it is to be clearly understood that this description is made only by way of example and not as a limitation on the scope of the invention.

What is claimed is:

1. A device for welding faulty points of communication cables comprising a means for impressing a breakdown voltage to communication cables and a means for impressing a welding voltage having a larger current capacity than said breakdown voltage thereto, said means being operable to impress said welding voltage automatically and without interruption in response to breakdown in said cable caused by said breakdown voltage whereby the fault is welded.

2. A device for welding faulty points of communication cables comprising means for impressing a breakdown voltage between two adjacent cores in a multicore communication cable, means for impressing a welding voltage having a larger current capacity than said breakdown voltage thereto, said means operable in response to a current flow as a result of breakdown between two adjacent cores, and means operable on failure of breakdown voltage to cause breakdown to remove said breakdown voltage from said cores after a prescribed period of time without causing the application of welding voltage.

3. A device as claimed in claim 2 in which is further provided means for automatically limiting the duration of impression of said welding voltage and operable when said means for impressing a welding voltage operates, said means being responsive to the magnitude of welding current to limit said duration in proportion to the magnitude of said welding current.

4. A device for welding faulty points of communication cables comprising means for impressing a D. C. breakdown voltage to the communication cables, means for impressing a D. C. welding voltage having a larger current capacity than said breakdown voltage thereto, said means for impressing a welding voltage being operable automatically and without interruption in response to breakdown in said cable caused by said breakdown voltage, and means for reversing the polarity of the D. C. voltage impressed on said communication cables.

5. A device for welding faulty points of communication cables comprising means for impressing a D. C. breakdown voltage to the communication cables, means for impressing a D. C. welding voltage having a larger current capacity than said breakdown voltage thereto, said means for impressing a welding voltage being operable automatically and without interruption in response to breakdown in said cable caused by said breakdown voltage, means for reversing the polarity of the D. C. voltage impressed on said communication cables, means for automatically limiting the duration of impression of the welding voltage and operable when said means for impressing a welding voltage operates, and means for restoring the device to a condition in which the device is ready to impress a new breakdown voltage and welding voltage.

References Cited in the file of this patent

UNITED STATES PATENTS

| | | |
|---|---|---|
| 2,087,783 | Savage | July 20, 1937 |
| 2,170,813 | Doble | Aug. 29, 1939 |
| 2,439,940 | Lewis | Apr. 20, 1948 |
| 2,565,307 | Harding | Aug. 21, 1951 |
| 2,707,267 | Gavin | Apr. 26, 1955 |